(12) United States Patent
Lindquist

(10) Patent No.: US 9,799,127 B2
(45) Date of Patent: Oct. 24, 2017

(54) DISPLAYING A LIVE STREAM OF EVENTS USING A DYNAMICALLY-CONSTRUCTED THREE-DIMENSIONAL DATA TREE

(71) Applicant: Deep Node, Inc., Tallahassee, FL (US)

(72) Inventor: Benjamin Lindquist, Tallahassee, FL (US)

(73) Assignee: Deep Node, Inc., Falls Church, VA (US)

( * ) Notice: Subject to any disclaimer, the term of this patent is extended or adjusted under 35 U.S.C. 154(b) by 31 days.

(21) Appl. No.: 14/636,912

(22) Filed: Mar. 3, 2015

(65) Prior Publication Data

US 2015/0248779 A1    Sep. 3, 2015

Related U.S. Application Data

(60) Provisional application No. 61/946,919, filed on Mar. 3, 2014, provisional application No. 61/946,921, filed on Mar. 3, 2014.

(51) Int. Cl.
*G06T 11/20*    (2006.01)
*G06F 21/55*    (2013.01)

(52) U.S. Cl.
CPC .................. *G06T 11/206* (2013.01)

(58) Field of Classification Search
None
See application file for complete search history.

(56) References Cited

U.S. PATENT DOCUMENTS

| | | | |
|---|---|---|---|
| 6,278,464 B1* | 8/2001 | Kohavi | G06K 9/6253 |
| | | | 345/440 |
| 2008/0192302 A1* | 8/2008 | Rohall | G06Q 10/107 |
| | | | 358/402 |
| 2009/0287814 A1* | 11/2009 | Robertson | G06F 17/30994 |
| | | | 709/224 |
| 2010/0125791 A1* | 5/2010 | Katis | H04M 3/42221 |
| | | | 715/716 |

* cited by examiner

*Primary Examiner* — Yi Wang
(74) *Attorney, Agent, or Firm* — Crowell & Moring LLP

(57) ABSTRACT

A dynamically configured tree form and corresponding graphical elements graphically represent information contained in a live stream of event data. The tree form is positioned in virtual three dimensional space within a computer graphical user interface such that the root of the tree is in the center of the screen, originating at the farthest distance from the viewer along the z axis. The tree form is configured to guide movement of the three dimensional graphical elements which represent individual measurements of events during specific time periods. The outermost, or leaf, portions of the tree represent the present time. The root or base of the tree represents the maximum duration that is being measured.

16 Claims, 17 Drawing Sheets

DISPLAYING A LIVE STREAM OF EVENTS USING A DYNAMICALLY-CONSTRUCTED THREE-DIMENSIONAL DATA TREE

CROSS REFERENCE TO RELATED APPLICATIONS

This application claims the benefit of U.S. Provisional Patent Application No. 61/946,919, filed on Mar. 3, 2014, and U.S. Provisional Patent Application No. 61/946,921, filed on Mar. 3, 2014.

FIELD OF THE INVENTION

The present invention relates generally to displaying cyber data, and more particularly to a method for displaying a live stream of events using a dynamically-constructed three dimensional data tree.

BACKGROUND OF THE INVENTION

The annual worldwide cost of cybercrime is estimated to be nearly $450 billion and climbing. Hacking attempts are increasing in sophistication and frequency. Companies in data sensitive industries are particularly increasing their cybercrime budgets on an annual basis to help defend against and minimize the chances of data breaches.

Attempts to combat such cybercrime have taken numerous forms, including using data visualization techniques. However, the known data visualization techniques have taken a geographical or physical approach, which tends to result in visual spaghetti and cognitive dissonance. Accordingly, there is a need for a method of effectively visualizing cyber data.

SUMMARY OF THE INVENTION

Disclosed and claimed herein is a method for displaying a live stream of events using a dynamically-constructed three-dimensional data tree. In one embodiment, the method includes receiving a plurality of messages into the message queue over a period of time. A root limb object of the dynamically-constructed three-dimensional data tree is constructed and a key for each of the plurality of messages is determined, wherein the key are determined, at least in part, as a function of a message length for a corresponding one of the plurality of messages.

The method further includes constructing a plurality of limb objects branching from the root limb object of the dynamically-constructed three-dimensional data tree based, at least in part, on the determined keys. A plurality of blip objects is then constructed along corresponding ones of the plurality of limb objects, wherein each of the plurality of blip objects correspond to one of the plurality of messages, and wherein the blip objects each have a position within the dynamically-constructed three-dimensional data tree corresponding to a particular time at which such message was received into the message queue. Finally, the dynamically-constructed three-dimensional data tree, including the root limb object, the plurality of limb objects, and the plurality of blip objects, is displayed on a graphical user interface, wherein the dynamically-constructed three-dimensional data tree represents a visualization of the plurality of messages for the period of time.

Other aspects, features, and techniques of the invention will be apparent to one skilled in the relevant art in view of the following description of the exemplary embodiments of the invention.

DETAILED DESCRIPTION OF THE EXEMPLARY EMBODIMENTS

Figure 1A:
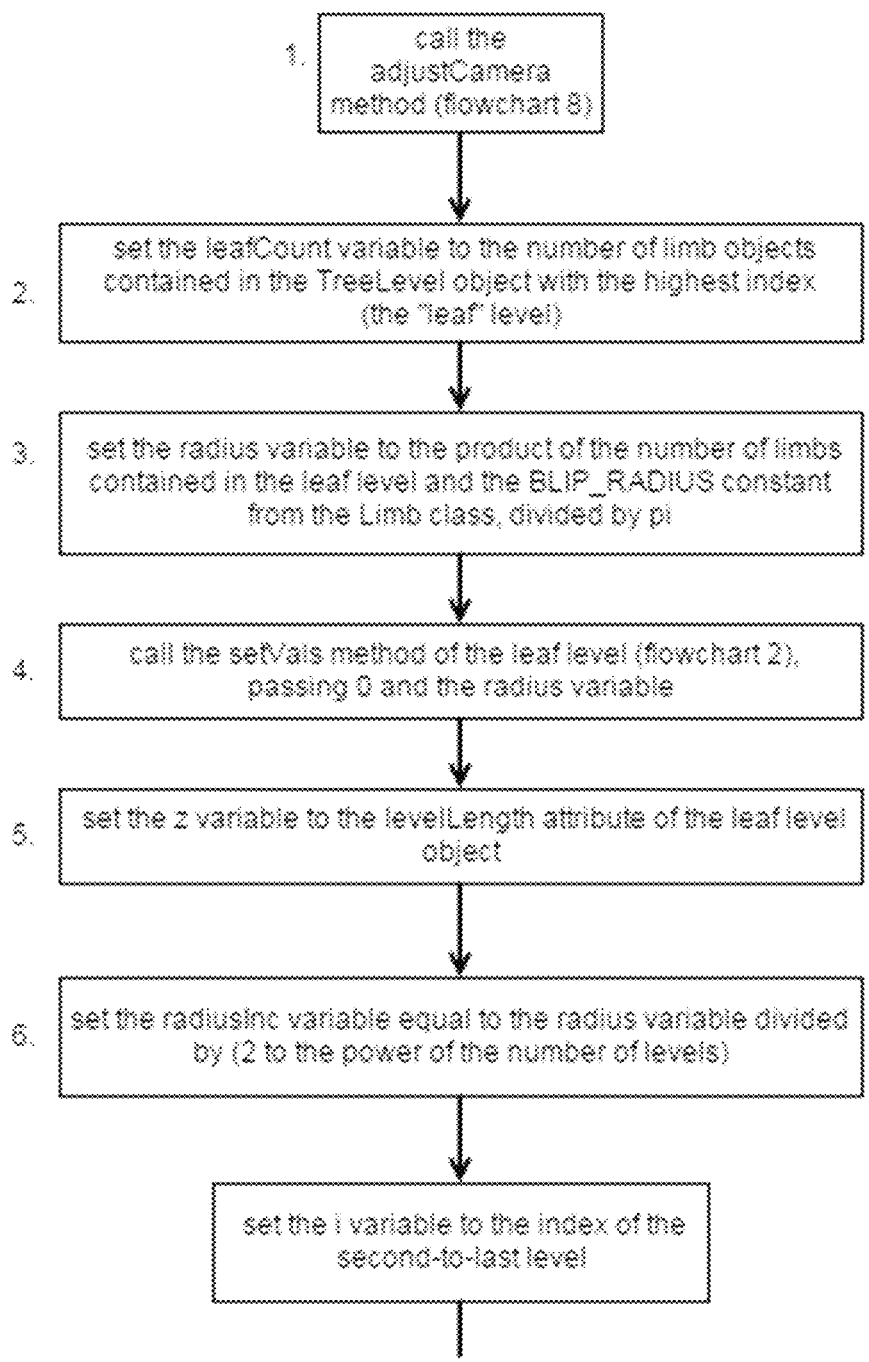
FIGS. 1A-1M illustrate flow diagrams of various processes carried out in accordance with one or more embodiments of the invention.

The present disclosure relates generally to a dynamically configured tree form (also referred to as a "timewell") and corresponding graphical elements graphically represent information contained in a live stream of event data. The tree form is positioned and displayed in virtual three dimensional space within a computer graphical user interface such that the root of the tree is in the center of the screen, originating at the farthest distance from the viewer along the z axis. The tree form is configured to guide movement of the three dimensional graphical elements which represent individual measurements of events during specific time periods. The outermost, or leaf, portions of the tree represent the present time. The root or base of the tree represents the maximum duration that is being measured.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description, numerous specific details are set forth in order to provide a thorough understanding of the present invention. However, it should be appreciated that the invention may be practiced without such specific details. Additionally, for brevity sake well-known methods, procedures, components, and circuits have not been described in detail.

In one or more embodiments, the invention may be implemented using an object oriented programming language with an OpenGL library; for example, Java with the JMonkeyEngine library. In such embodiments, the following classes (types of object) may be used: Builder, Limb, TreeLevel, and Blip. The Builder class may be defined to contain a method which is executed first; this could be a "main" method or other method which is called from another program making use of the invention. This first executed method may construct a new Limb object called rootLimb and then call the "draw" method of this object in an infinite loop. The draw method may be passed into a queue into which messages are placed by a separate thread. This queue of messages may represent the interface between the invention and other program elements which makes use of the invention.

In certain embodiments, a message may be an array of strings, such as an array of three strings, for example. Sample messages that could be processed and are used for the sake of illustration only are expressed as follows in Java String array notation:

{"potatoes", "NorthAmerica", "Idaho"}
{"potatoes", "Europe", "Ireland"}
{"gas", "SouthAmerica", "Venezuela"}
{"oil", "Africa", "Nigeria"}
{"oil", "Asia", "China"}
{"oil", "Asia", "China"}
{"oil", "Asia", "Japan"};

Such messages can implicitly form a tree with "potatoes", "gas", and "oil" being branches off of root; "NorthAmerica" and "Europe" being branches off of "potatoes"; "SouthAmerica" being a branch off of "gas"; "Africa" and "Asia" being branches off of "oil"; "Idaho" being a branch off of "NorthAmerica"; "Ireland" being a branch off of "Europe"; "Venezuela" being a branch off of "SouthAmerica"; "Nigeria" being a branch off of "Africa"; and "China" and "Japan" being branches off of "Asia". Such an implicit tree may be made explicit by the invention by a novel processing of the messages. In this example, the tree is composed of Limb objects corresponding to the branches described, and Blip objects corresponding to the messages themselves and the times the messages were received, are displayed along the corresponding Limb object and animated down the tree to root over time.

Given a queue into which the messages described are placed, in the order described and at a rate of one per second, the invention may carry out the following operations:

First, the Builder class main method may be executed. This method constructs a new Limb called rootLimb, passing it null as its "parent" parameter, constructs a queue for holding messages, spawns a thread which reads a message from a file each second and places the message into the queue, and then enters a loop which calls the draw method of rootLimb infinitely. This file may be a text file containing, for example, the string array described above. The input method of reading messages from a file, one per second, could be replaced by any number of input methods appropriate to the type and source of messages desired to be visualized.

While the queue has a message, and less than 40 milliseconds—or another time value as appropriate—has elapsed, the draw method may read one message from the queue, call the processMsg method, and then pass it the message (a String[ ] of length 3 in this example) and the integer 0.

Each instance of Limb may contain a hashmap for holding Limb Objects, indexed by Strings, and called "children". The processMsg method may receive two parameters: a message and an integer value ("int"). If the "int" passed in is less than the length of the message, the processMsg method takes the element of the message, indexed by the "int," and uses that as a key. A "get" operation from the hashmap may then be performed using the key.

In our example, the first such "get" operation will be with a key of "potatoes" and will return null. The processMsg method and hashmap belong to the rootLimb object. Upon receiving "null" from the "get" operation, the processMsg method constructs a new Limb object, passing "this" (the object whose method is being executed, in this case rootLimb) as the parent parameter, and then performs a "put" operation of the new Limb into the hashmap, with the key.

The Limb class contains a static array of TreeLevel objects, called "levels". This array is only instantiated by Limb when its parent is null (i.e., it is root). This singleton array is accessible to all Limb objects, and is the same length as the length of a message array. Each TreeLevel object contains a treemap of Limb objects, keyed by Strings, and called "limbs". Each TreeLevel object also contains an integer value called "millisPerPeriod" which can be configured as desired and which specifies the number of milliseconds in the past represented by Limbs within the corresponding level of the tree. Each TreeLevel object also contains values called "timeOffset" and "timeCount" which may be set to the total amount of time in the past represented by the level of the tree and all levels higher (closer to the leaves and closer to the camera); and the number of time periods of length millisPerPeriod which are included in this level, respectively.

Immediately after "putting" the newly created child Limb into the Limb hashmap, the processMsg method may also put the child Limb into the treemap of the TreeLevel object indexed by the "int" passed in. The key used is a concatenation of the message elements from 0 to the "int" passed in, with a separator such as ".". Thus, upon completion of processing of the first message in our example, the 0 index TreeLevel object's treemap contains one Limb, with a key of "potatoes"; the 1 index TreeLevel object's treemap contains one Limb, with a key of "potatoes.NorthAmerica", and the 2 index TreeLevel object's treemap contains one Limb with the key of "potatoes.NorthAmerica.Idaho". A treemap (java.util.TreeMap) may be preferably used since it has the feature of producing an iterator which is ordered across the keys; in the case of the String keys used here, which may be in alphabetical order.

At this point, the method may then call the "draw" method of this new Limb, passing it the message and the "int" it originally received, incremented by 1. If the "get" operation from the hashmap had returned a Limb object, no new Limb object would have been created, and the processMsg method of the returned Limb object would have been called in the same way.

If the "int" passed in is equal to the length of the message, the processMsg method constructs a new Blip object and adds it to the ArrayList of Blip objects that each Limb contains. The Blip object is passed the current system time, which it stores in its "incept" variable; if desired, the time could instead be obtained from the message itself, given a message structure which includes this additional item. The Blip constructor is also passed the Limb object which is creating the Blip; this is considered the Blip's parent. The processMsg, as can be seen, is recursive and is responsible for creating a tree structure of Limb objects which mirrors the tree structure implicit in the messages received.

Figure 1B:
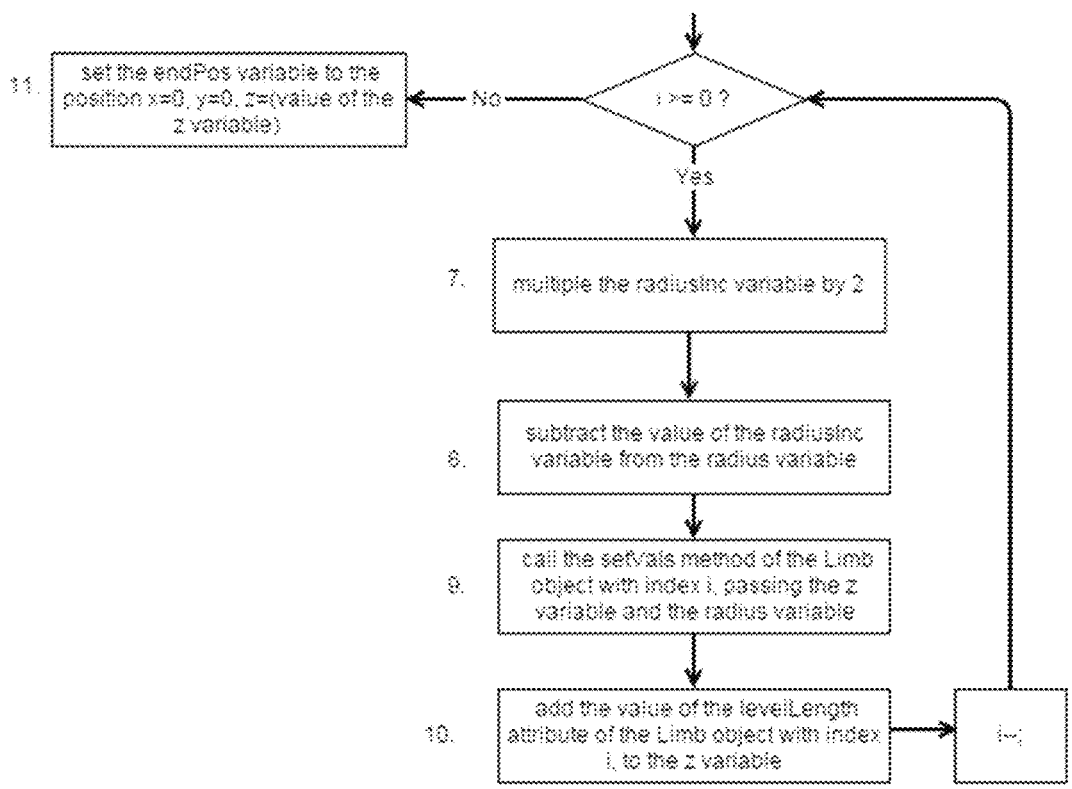

When the processMsg method returns to the draw method, the draw method continues its message reading loop; when this loop is completed (meaning there are no more messages in the queue or the configured elapsed time has passed), the draw method performs the following computer-implemented operations, as illustrated and detailed in process diagram FIGS. 1A-1B, having functional blocks labeled in accordance with the following exemplary code lines:

```
1    adjustCamera( );
2    leafCount = Limb.levels[Limb.levels.length – 1].limbs.size( );
3    float radius = (float)Limb.levels[Limb.levels.length –
     1].limbs.size( ) * Limb.BLIP_RADIUS / (float)Math.PI;
4    Limb.levels[Limb.levels.length – 1].setVals(0f, radius);
5    float z = Limb.levels[Limb.levels.length – 1].levelLength;
6    float radiusInc = radius / (float)Math.pow(2d, Limb.levels.length
     + 1d); for ( int i = Limb.levels.length – 2; i >= 0; i-- ) {
7        radiusInc *= 2f;
8        radius -= radiusInc;
9        Limb.levels[i].setVals(z, radius);
10       z += Limb.levels[i].levelLength;
     }
11   endPos = new Vector3f(0f, 0f, z);
```

Limb.BLIP_RADIUS is a constant used to define the size of the 3 d graphical elements created by the Blip object later in the process, and may be .8f. The "adjustCamera" method is described later.

Figure 1C:
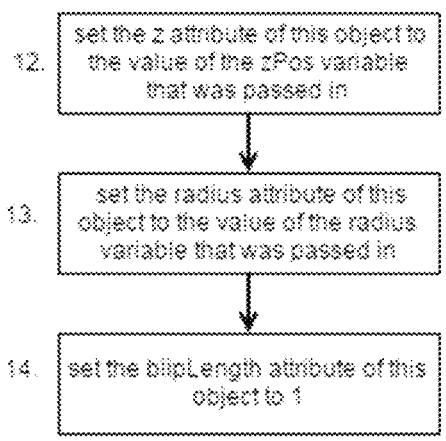

In addition, the TreeLevel "setVals" method may perform the following computer-implemented operations, as illustrated and detailed in process diagram FIG. 1C, having functional blocks labeled in accordance with the following exemplary code lines:

```
12   this.z = zPos;
13   this.radius = radius;
14   this.blipLength = 1.0f;
```

Figure 1D:
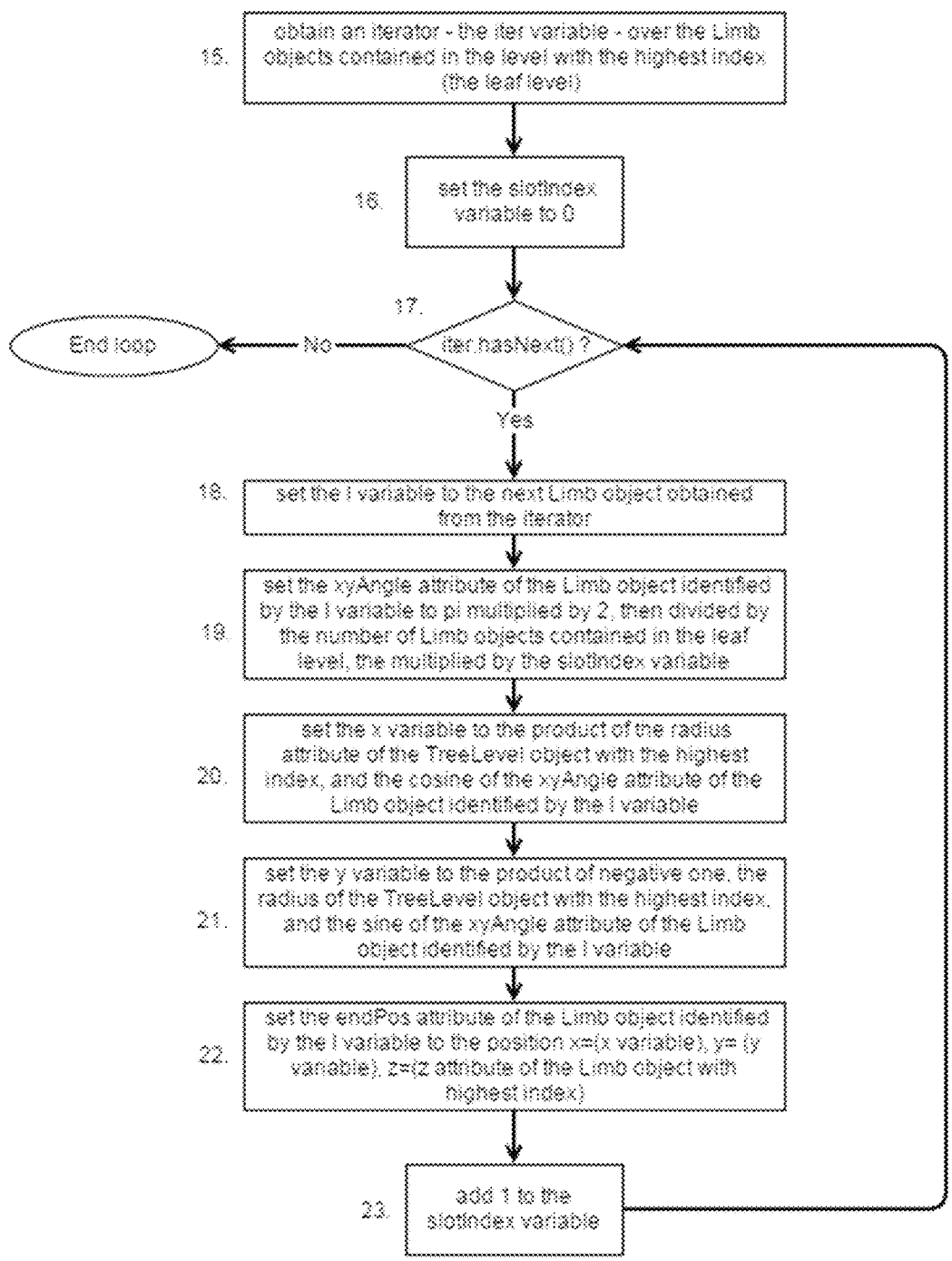

Next, the draw method may perform the following computer-implemented operations, as illustrated and detailed in process diagram FIG. 1D, having functional blocks labeled in accordance with the following exemplary code lines:

```
15   Iterator<Limb> iter = Limb.levels[Limb.levels.length –
     1].limbs.values( ).iterator( );
16   int slotIndex = 0;
17   while ( iter.hasNext( ) ) {
18       Limb l = iter.next( );
19       l.xyAngle = (float)Math.PI * 2 /
     (float)leafLevel.limbs.size( ) * (float)slotIndex;
20       float x = Limb.levels[Limb.levels.length – 1].radius *
```

```
         (float)Math.cos(l.xyAngle);
21       float y = (–1) * Limb.levels[Limb.levels.length – 1].radius *
     (float)Math.sin(l.xyAngle);
22       l.endPos = new Vector3f(x, y,
     Limb.levels[Limb.levels.length – 1].z));
23       slotIndex++;
     }
```

Figure 1E:
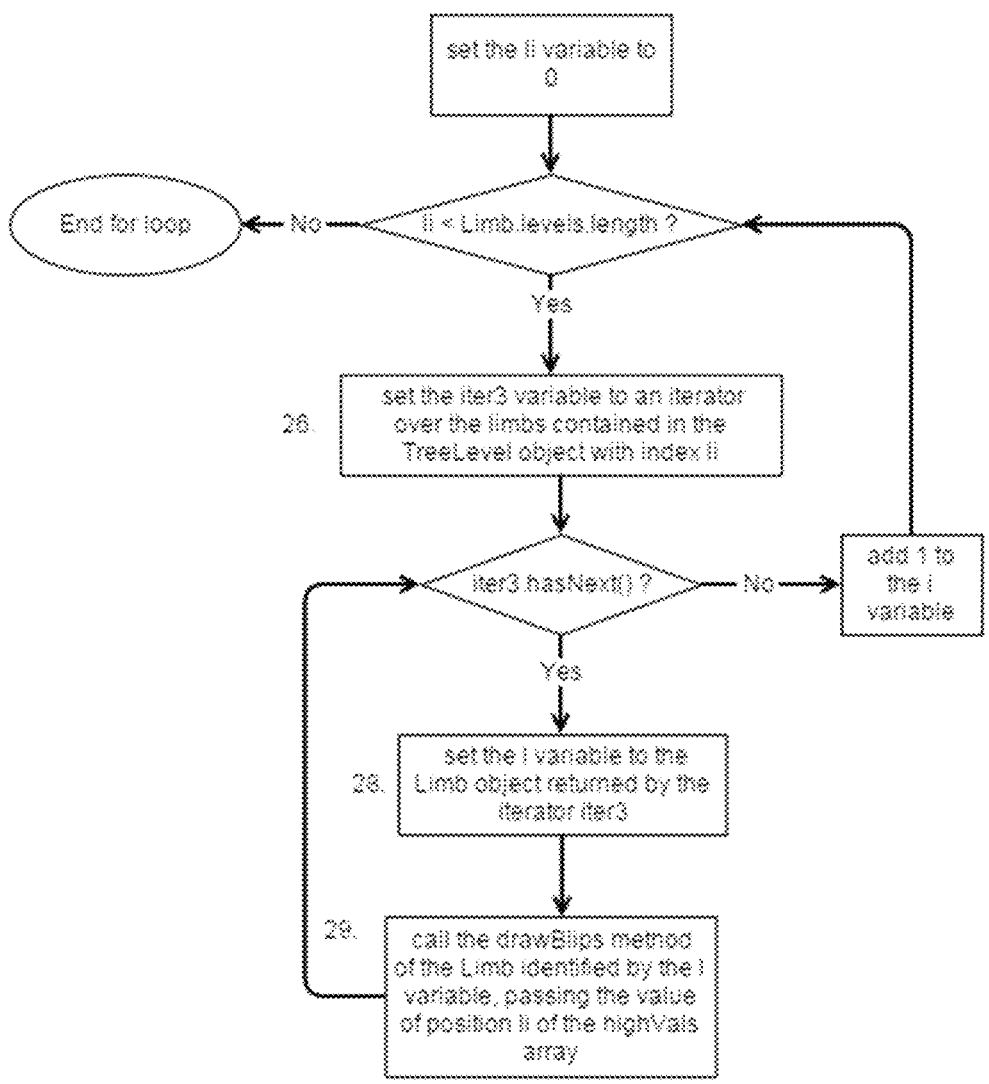

Next the draw method may call the drawChildren method, passing it the int 0. When the drawChildren method completes, the draw method may perform the following computer-implemented operations, as further illustrated and detailed in FIG. 1E:

```
     for ( int li = 0; li < Limb.levels.length; li++ ) {
26       Iterator<Limb> iter3 =
     Limb.levels[li].limbs.values( ).iterator( );
         while ( iter3.hasNext( ) ) {
28           Limb l = iter3.next( );
29           l.drawBlips(highVals[li], li);
         }
     }
```

Figure 1F:
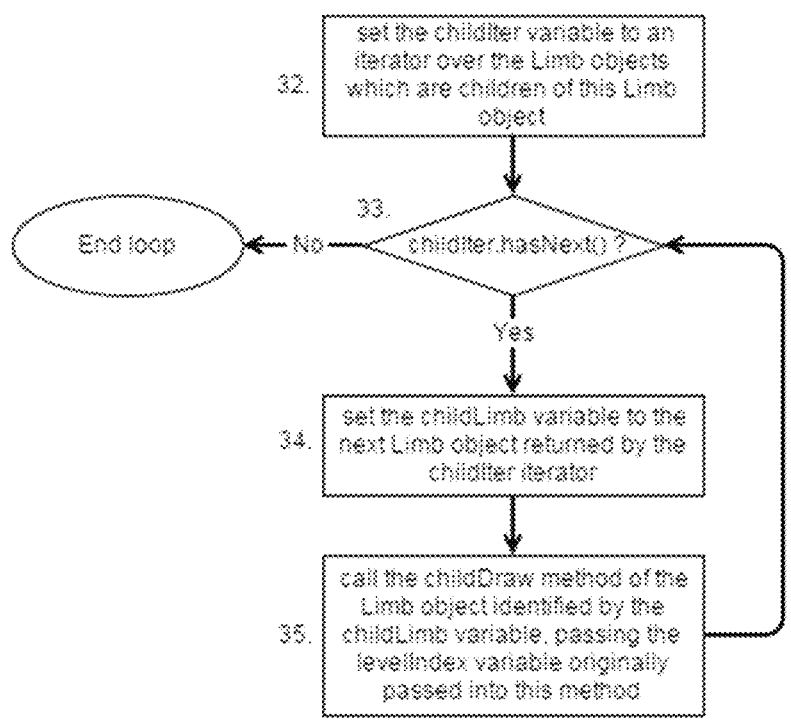

The drawChildren method performs the following computer-implemented operations, as further illustrated and detailed in FIG. 1F:

```
32   Iterator<Limb> childIter = children.values( ).iterator( );
33   while ( childIter.hasNext( ) ) {
34       Limb childLimb = childIter.next( );
35       childLimb.childDraw(levelIndex);
     }
```

Figure 1G:
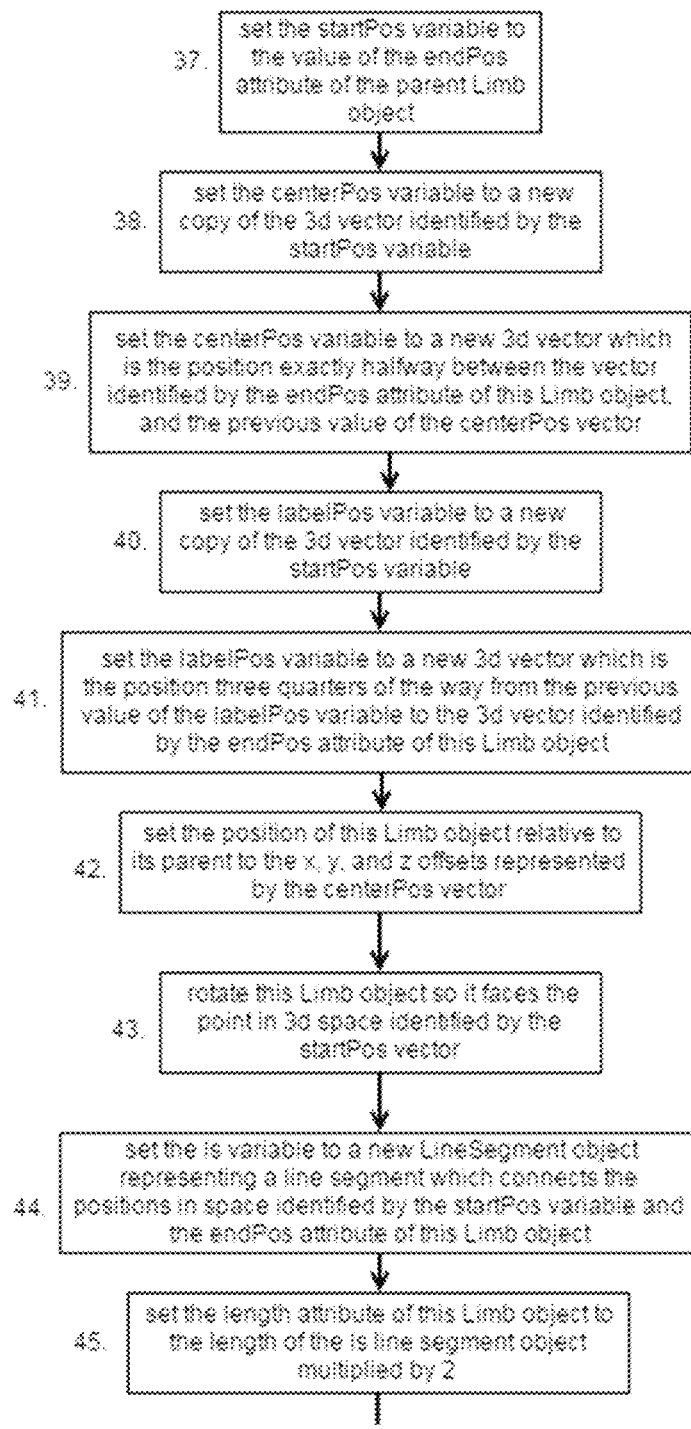
Figure 1H:
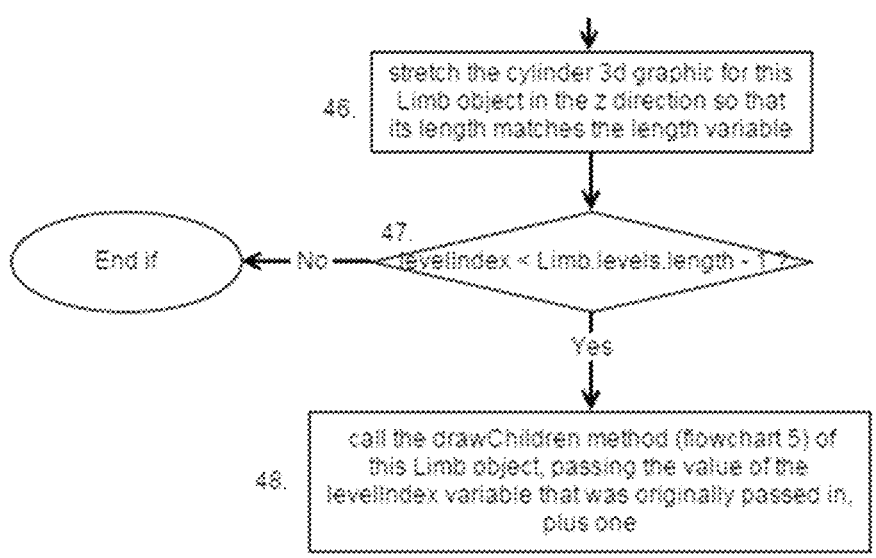
Figure 1I:
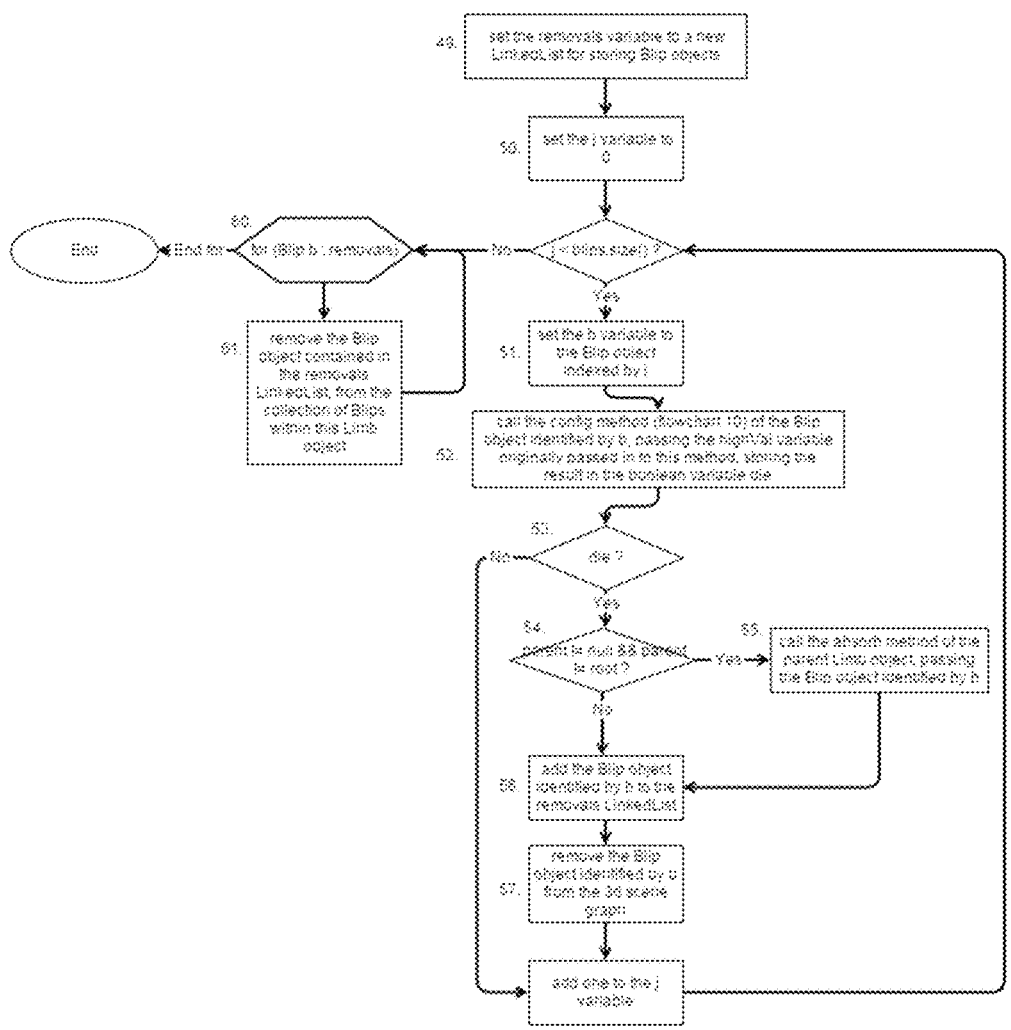

The childDraw method may then be passed an "int" called levelIndex in order to perform the following computer-implemented operations, as further illustrated and detailed in FIGS. 1G-1H, again having functional blocks labeled in accordance with the following exemplary code lines:

```
37   startPos = parent.endPos;
38   Vector3f centerPos = startPos.clone( );
39   centerPos.interpolate(endPos, .5f);
40   Vector3f labelPos = startPos.clone( );
41   labelPos.interpolate(endPos, .75f);
42   setLocalTranslation(centerPos);
43   lookAt(startPos, new Vector3f(0f, 1f, 0f));
44   LineSegment ls = new LineSegment(startPos, endPos);
45   length = ls.getExtent( ) * 2;
46   cylGeom.setLocalScale(1f, 1f, length);
47   if ( levelIndex < Limb.levels.length – 1 )
48       drawChildren(levelIndex + 1);
```

The "length" variable may be stored publically within the Limb, for later use by its child Blip objects. Methods such as setLocalTranslation and lookAt, used within childDraw, may be available because Limb extends the JMonkeyEngine class Node. The implementation could leverage other frameworks, or gaming engines, for driving OpenGL, DirectX, or similar mechanisms for creating, managing, and rendering a scenegraph of three dimensional objects for graphical display on a graphical user interface of a computer, mobile device, or gaming device. "cylGeom" refers to a three dimensional cylinder created by each Limb except root and providing visual representation of the Limb. The purpose of the childDraw operations is to adjust the dimensions, position, and rotation of the Node within the scenegraph, and the corresponding cylinder, in order to conform to the most recent configuration of the tree. The Blip objects are also JMonkeyEngine Node objects, and may inherit the orientation of their respective parent Nodes (the Limbs).

The drawBlips method may be passed the highest value found among all blips within the Limb's level (highVal) in order to perform the following computer-implemented operations, as further illustrated and detailed in FIG. 11, again having functional blocks labeled in accordance with the following exemplary code lines:

```
49      LinkedList<Blip> removals = new LinkedList<Blip>( );
50      for ( int j = 0; j < blips.size( ); j++ ) {
51          Blip b = blips.get(j);
52          boolean die = b.config(highVal);
53          if ( die ) {
54              if ( parent != null && parent != root )
55                  parent.absorb(b);
56              removals.add(b);
57              b.detach( );
            }
        }
60      for ( Blip b : removals )
61          blips.remove(b);
```

Figure 1J:
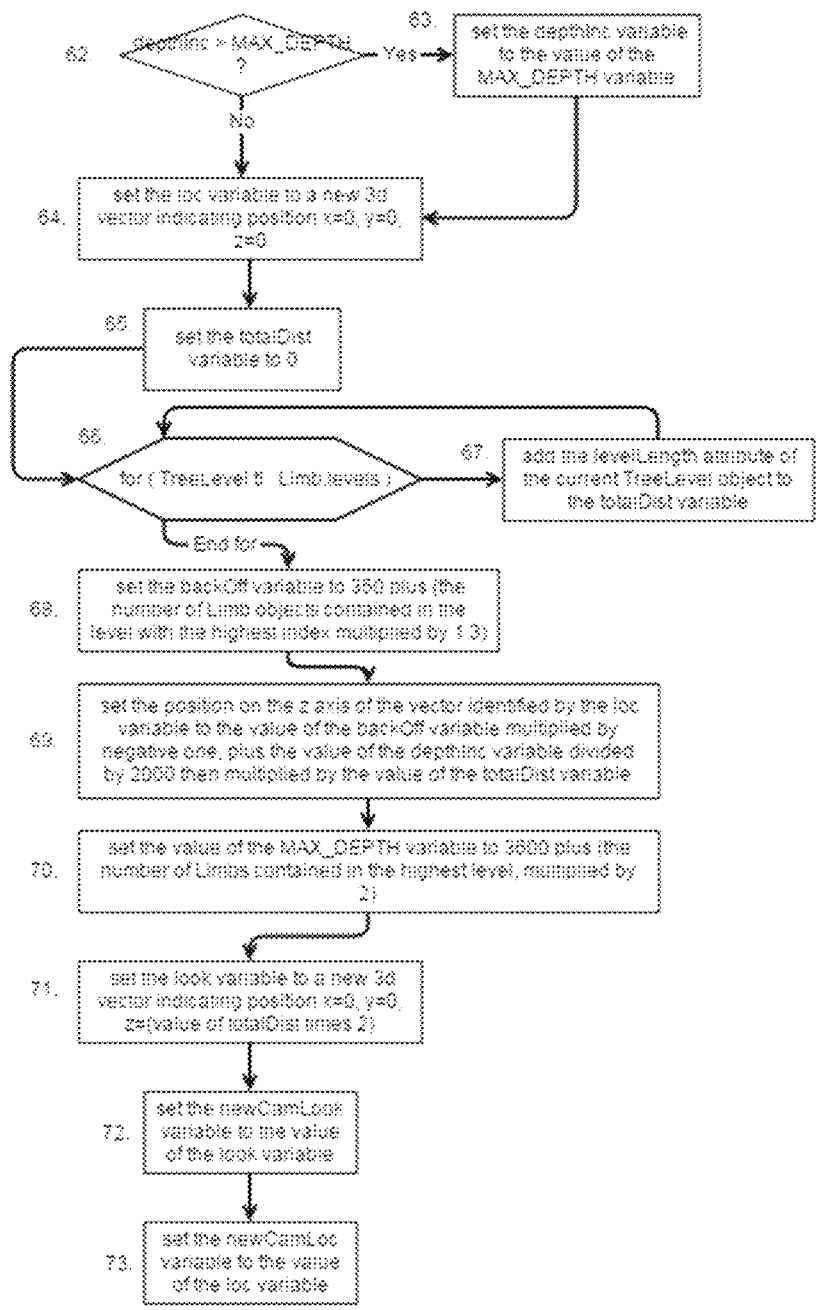

The adjustCamera method performs the following computer-implemented operations, as further illustrated and detailed in FIG. 1J, again having functional blocks labeled in accordance with the following exemplary code lines:

```
62      if ( depthInc > MAX_DEPTH )
63          depthInc = MAX_DEPTH;
64      Vector3f loc = new Vector3f(0f, 0f, 0f);
65      float totalDist = 0f;
66      for ( TreeLevel tl : Limb.levels )
67          totalDist += tl.levelLength;
68      float backOff = 350f + (float)Limb.levels[Limb.levels.length – 1].limbs.size( ) * 1.3f;
69      loc.z = backOff * –1f + (float)depthInc / 2000f * totalDist;
70      MAX_DEPTH = 3600 + rootLimb.leafCount * 2;
71      Vector3f look = new Vector3f(0f, 0f, totalDist * 2f);
72      newCamLook = look;
73      newCamLoc = loc;
```

"depthInc" is a variable which may be modified by various controls, such as keypresses or mouse actions, as programmed into software configured to carry out one or more aspects of the invention, in order to move the camera into and out of the tree as desired by the user. "newCamLook" and "newCamLoc" may be variables which can be set by the user in order to cause the software to set the direction and location of the camera, respectively, using the methods appropriate to the three dimensional scenegraph engine being utilized by the invention.

Figure 1K:
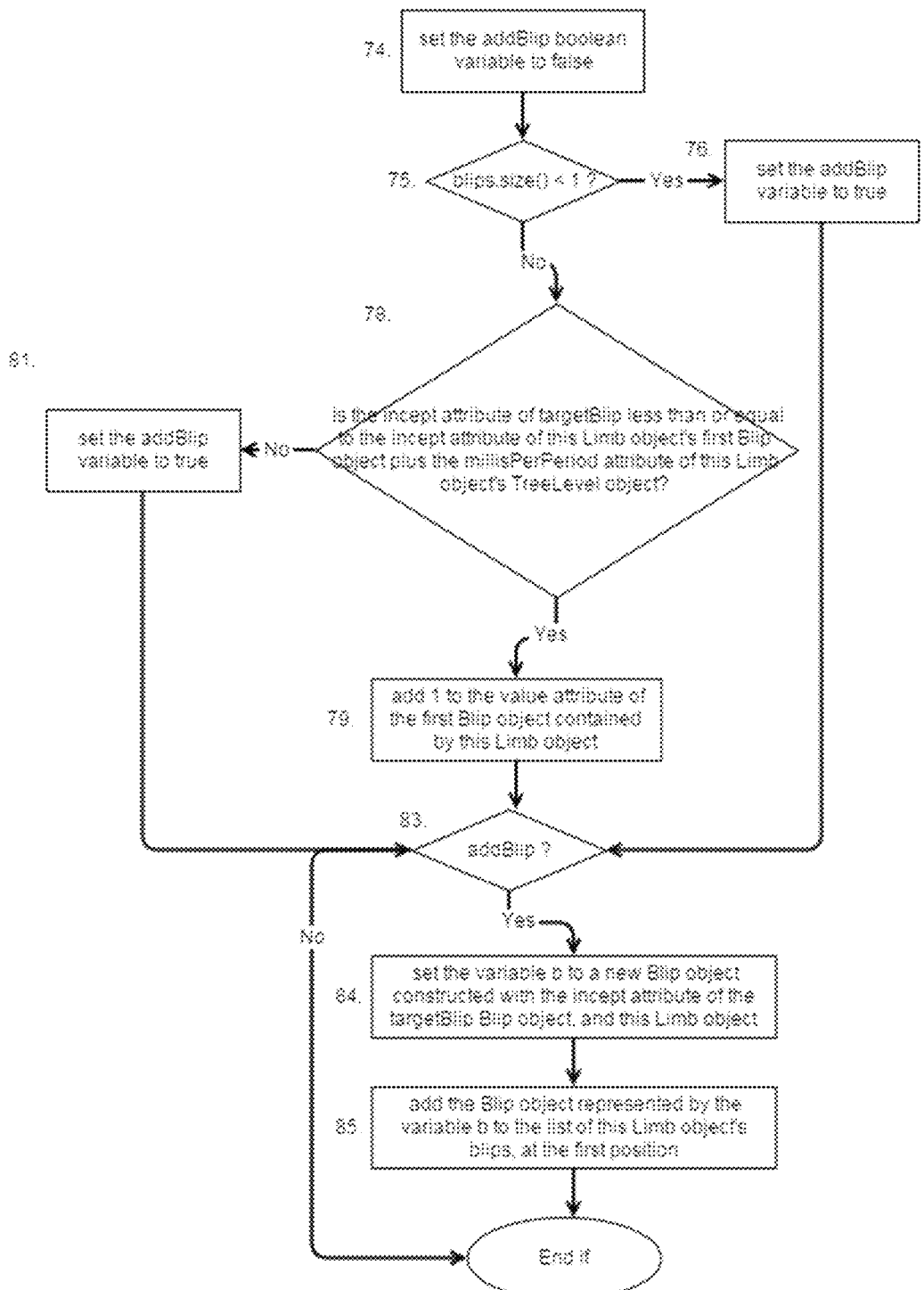

The "absorb" method of the Limb class is passed a Blip object called "targetBlip" and the index of the TreeLevel object corresponding to the Limb—called levelInd—and performs the following computer-implemented operations, as further illustrated and detailed in FIG. 1K, again having functional blocks labeled in accordance with the following exemplary code lines:

```
74      boolean addBlip = false;
75      if ( blips.size( ) < 1 )
76          addBlip = true;
        else {
78          if ( targetBlip.incept <= blips.get(0).incept +
                Limbs.levels[levelInd].millisPerPeriod )
```

```
79              blips.get(0).value++;
            else
81              addBlip = true;
        }
83      if ( addBlip ) {
84          Blip b = new Blip(targetBlip.incept, this);
85          blips.add(0, b);
        }
```

The value variable of a Blip may indicate the number of messages the Blip represents. It could also represent the total of a measurement transmitted along with the messages, where additional variables could be added to the Blip object to control the color and/or shape of the three dimensional graphical objects which the Blip objects generate in order to be visible to the user.

The Blip constructor may set the value variable to 1 and create a three dimensional cylinder using the three dimensional graphic engine which has been integrated. This cylinder may be displayed at a point somewhere along the cylinder created by the Limb which is the Blip's parent, begins at the point closest to the camera, and progresses "inward" along the Limb cylinder over time. Since a Blip, in the embodiment which uses the JMonkeyEngine graphics library, is a Node, it can attach itself to the Node represented by the parent Limb, and thusly inherit the position and orientation of the Limb within the virtual three dimensional space. The Blip constructor is passed the Limb object which is its parent, and it stores that as the variable "limb". A Limb object may have a variable which is a reference to the TreeLevel object corresponding to the level of the tree to which the Limb object belongs.

Figure 1L:
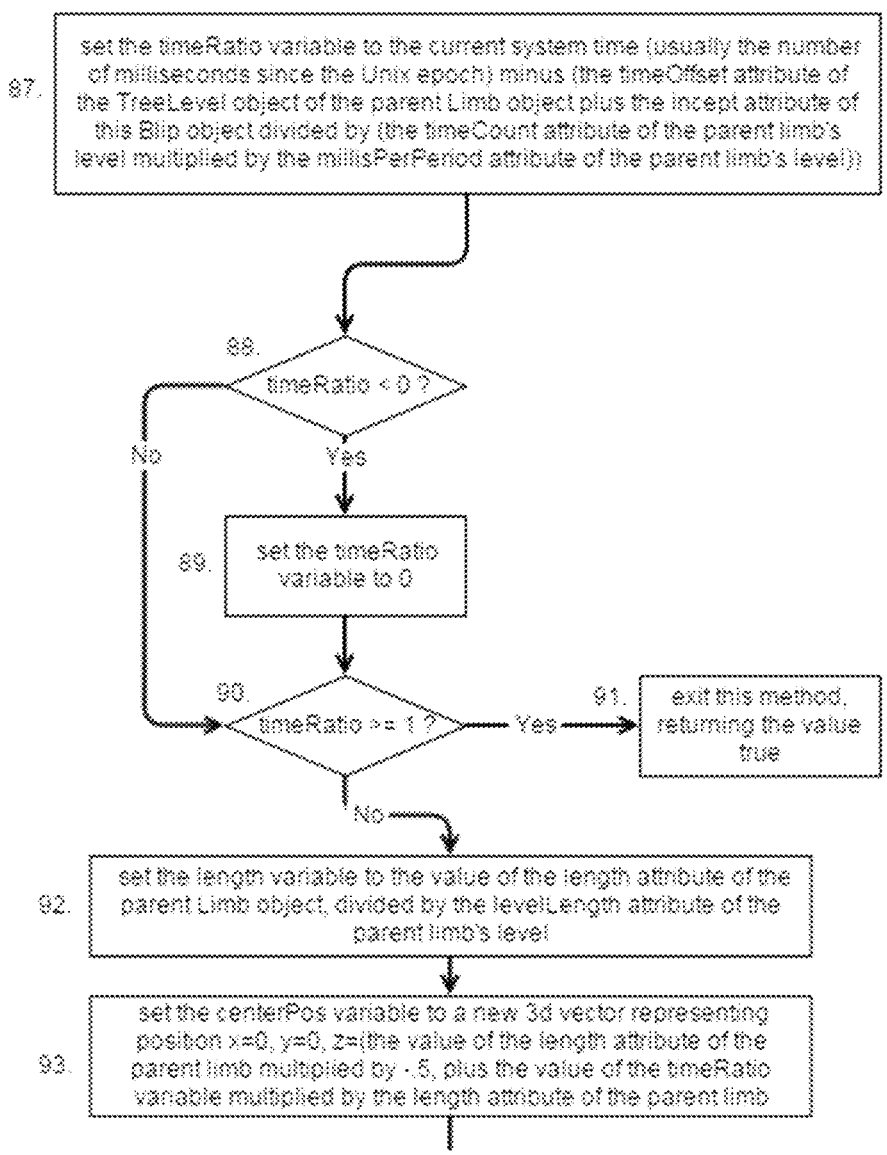
Figure 1M:
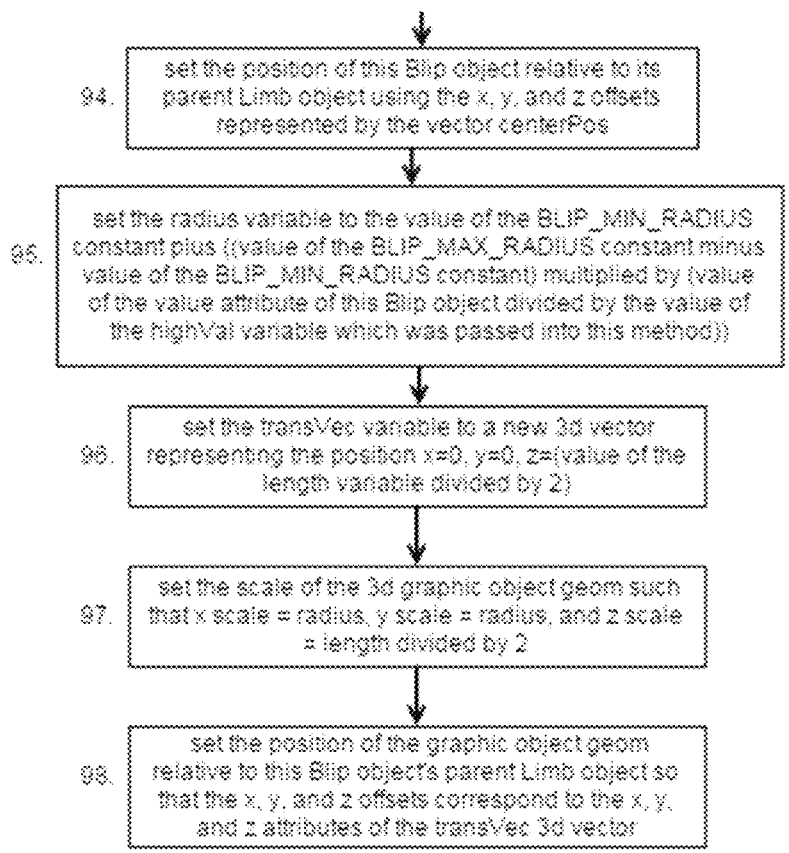

Both the Blip constructor and the drawBlips method of Limb may invoke the Blip "config" method, which is passed the highest "value"—called highVal—found among all Blips, and which performs the following computer-implemented operations, as further illustrated and detailed in FIGS. 1L-1M, again having functional blocks labeled in accordance with the following exemplary code lines:

```
87      float timeRatio = (float)(System.currentTimeMillis( ) –
            (limb.level.timeOffset + incept)) /
            (limb.level.timeCount * limb.level.millisPerPeriod);
88      if ( timeRatio < 0 )
89          timeRatio = 0;
90      if ( timeRatio >= 1f )
91          return true;
92      float length = limb.length / limb.level.levelLength;
93      Vector3f centerPos = new Vector3f(0f, 0f, limb.length * –.5f +
            timeRatio * limb.length);
94      setLocalTranslation(centerPos);
95      float radius = Limb.BLIP_MIN_RADIUS +
            (Limb.BLIP_MAX_RADIUS – Limb.BLIP_MIN_RADIUS) *
            (float)value / (float)highVal;
96      Vector3f transVec = new Vector3f(0f, 0f, length / 2);
97      geom.setLocalScale(radius, radius, length / 2);
98      geom.setLocalTranslation(transVec);
```

"setLocalTranslation" and "setLocalScale" may be methods provided by the JMonkeyEngine Node class, which set the translation of an object relative to its parent; and the scale of an object relative to its parent, respectively. "geom" is any three dimensional geometry or shape desired to represent the Blip.

Referring now to FIGS. 2A-2D, depicted are exemplary screenshots of a three dimensional data tree that was dynamically-constructed, as a function of time, in accordance with the principles of the invention. In particular, FIG.

Figure 2A:
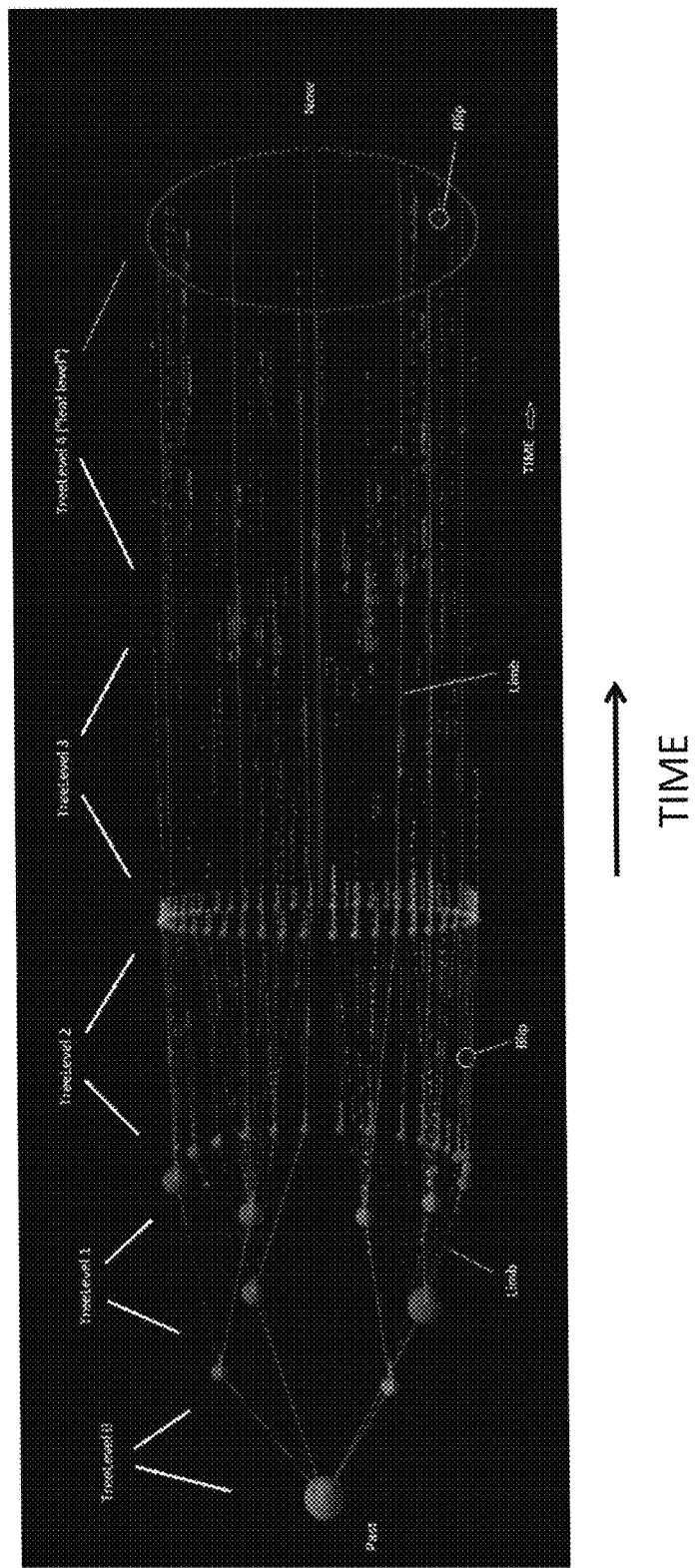
FIGS. 2A-2D depict exemplary screenshots of a three dimensional data tree that was dynamically-constructed, as a function of time, in accordance with the principles of the invention.
Figure 2B:
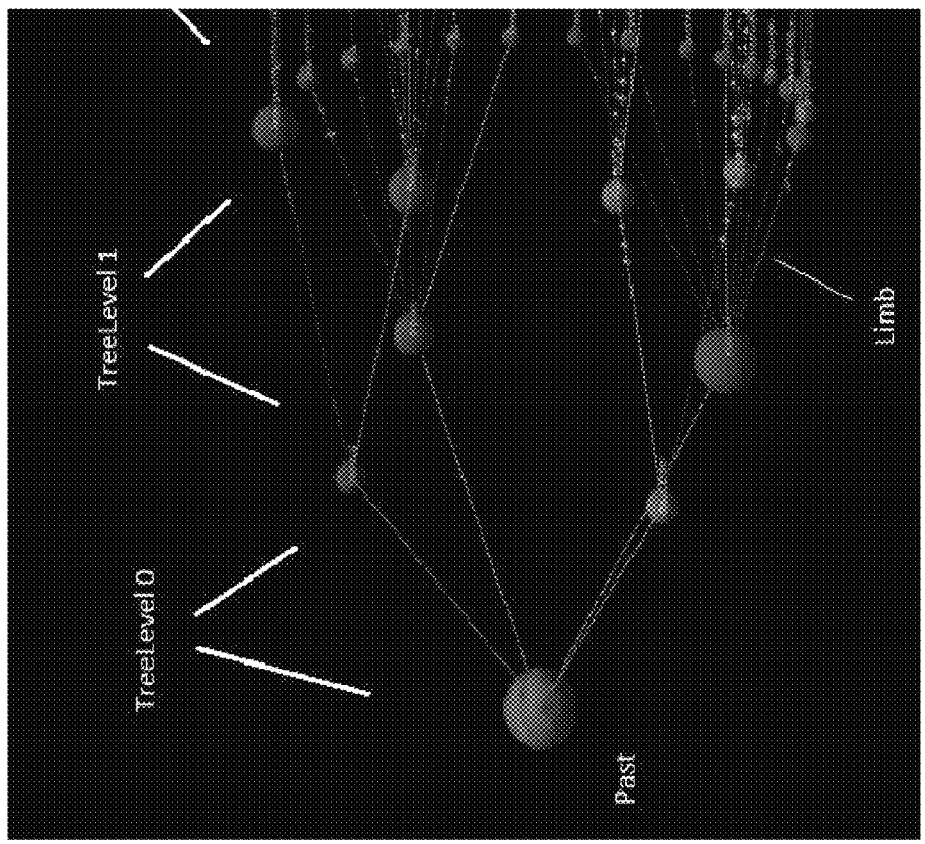
Figure 2C:
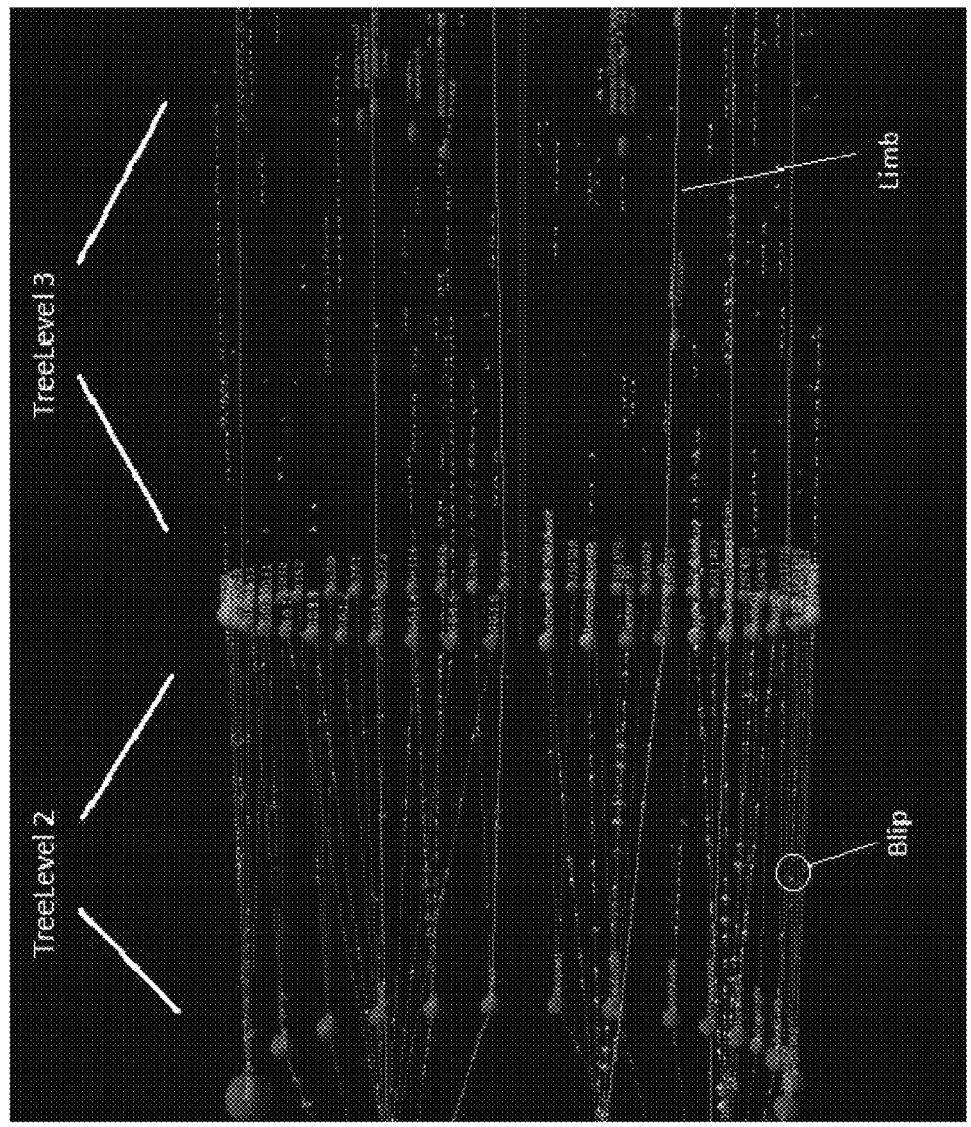
Figure 2D:
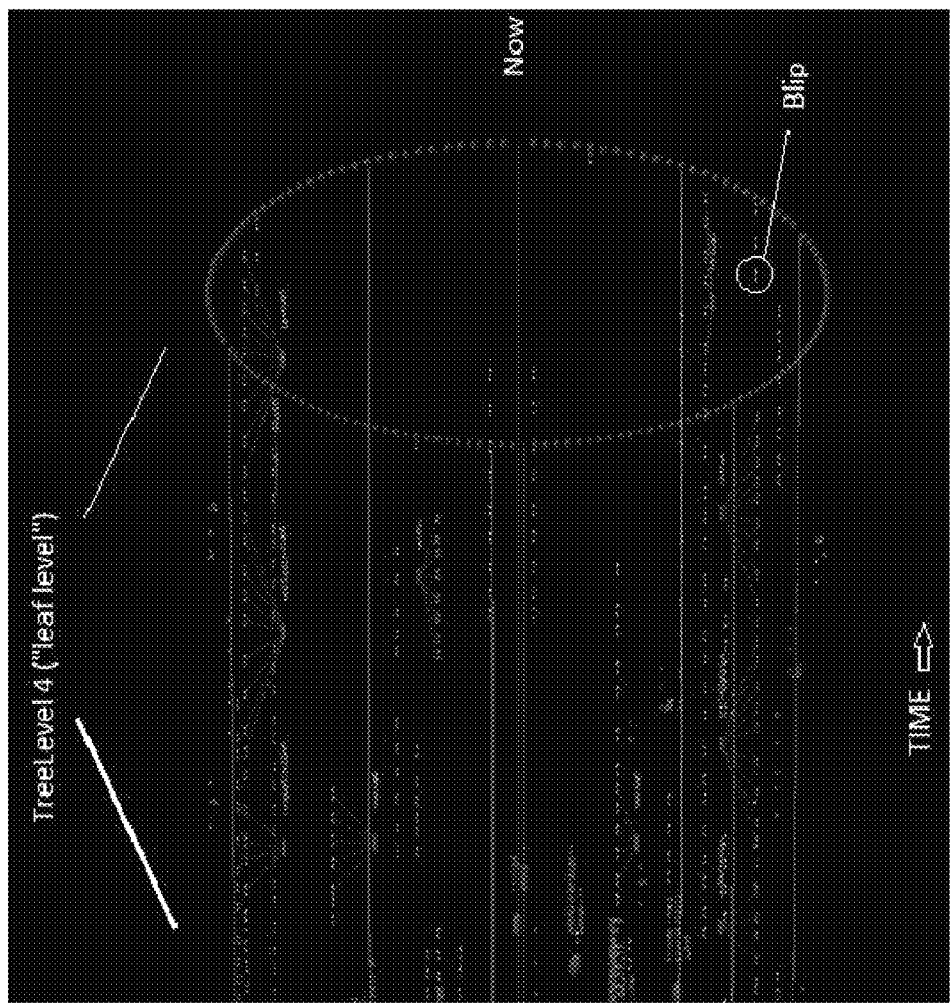

2A depicts the overall data tree beginning at TreeLevel 0 (past) and extending to TreeLevel 4 (now). FIG. 2B illustrates an enlarged view of a first segment of the overall data tree of FIG. 2A, including essentially only TreeLevel 0 and TreeLevel 1. FIG. 2C illustrates an enlarged view of a second segment of the overall data tree of FIG. 2A, including essentially only TreeLevel 2 and TreeLevel 3. And finally, FIG. 2D illustrates an enlarged view of a third segment of the overall data tree of FIG. 2A, in this case including essentially only TreeLevel 4 (the present).

In addition to the above disclosure relating to constructing and displaying three-dimensional data trees which represent a visualization of cyber data, the invention further envisions that the live stream of events may be described in terms of repeated patterns, such that anomalies or outliers within a stream of data may be discovered. In certain embodiments, one or more parameters corresponding to the received messages may be analyzed and pattern matched to known parameter values, e.g., parameter values known to correspond to cyber breaches, etc. in this way, higher risk data streams may be quickly identified.

It should further be appreciated that the timewell disclosed and described herein (i.e., the three dimensional data tree) may be used to facilitate a user's understanding of and interaction with three dimensional objects representing the aforementioned patterns by creating a tubular surface representing data transmission over time (referred to herein as "blips")—and providing a space within the tube where three dimensional objects may be placed which represent patterns. These pattern Objects may have three dimensional lines connecting them to the blips on the tube surface which match them. When viewed from a scenegraph camera located inside the tube, this configuration results in better usability, visibility, and ability to correlate messages over time.

While various examples have been described herein with respect to specific submenus and icons, it should be appreciated that such examples are provided by way of illustration only and are not intended to limit the scope of the invention. This application is intended to cover any variations, uses or adaptation of the invention following, in general, the principles of the invention, and including such departures from the present disclosure as come within the known and customary practice within the art to which the invention pertains.

What is claimed is:

1. A method for displaying a live stream of events using a dynamically-constructed three-dimensional data tree, the method comprising the acts of:
   receiving a plurality of messages into a message queue over a period of time;
   constructing a root limb object of the dynamically-constructed three-dimensional data tree, wherein the root limb object is aligned with a z-axis at the center of the dynamically-constructed three-dimensional data tree;
   determining a key for each of the plurality of messages, wherein each key is determined, at least in part, as a function of a message length for a corresponding one of the plurality of messages;
   constructing a plurality of limb objects branching out from the root limb object and from the z-axis of the dynamically-constructed three-dimensional data tree based, at least in part, on the determined keys;
   constructing a plurality of blip objects at different locations along a corresponding one of the plurality of limb objects for each of the plurality of limb objects, wherein each of the plurality of blip objects correspond to one of the plurality of messages, and wherein the blip objects each have a position within the dynamically-constructed three-dimensional data tree corresponding to a particular time at which such message was received into the message queue such that the blip objects are arranged along lengths of corresponding ones of the plurality of limb objects and down to the root limb object, whereby blip objects on outermost portions of the limb objects correspond to the most recently received of the plurality of messages and blip objects arranged toward the root limb object corresponding to less recently received of the plurality of objects; and
   displaying, on a graphical user interface, the dynamically-constructed three-dimensional data tree, including displaying the root limb object, the plurality of limb objects, and the plurality of blip objects, wherein the dynamically-constructed three-dimensional data tree represents a visualization of the plurality of messages for the period of time,
   wherein the dynamically-constructed three-dimensional data tree comprises a tubular structure, aligned with the z-axis, that is generated by the constructing of the plurality of limb objects such that the blip objects form a surface of the tube structure extending from said outermost portions of the limb objects inwardly down to the root limb object.

2. The method of claim 1, wherein each of the plurality of messages is an array of string values.

3. The method of claim 1, wherein the plurality of limb objects are arranged into a plurality of levels, wherein each of the plurality of levels corresponds to a portion of the period of time.

4. The method of claim 3, wherein, for each of the plurality of levels, a map is generated for a set of limb objects, from the plurality of limb objects, which were assigned to such level.

5. The method of claim 3, wherein said portion of the period of time is a user-definable value.

6. The method of claim 3, wherein each of the plurality of blip objects is placed on one of the plurality of limb objects to which it corresponds and in one of the plurality of levels based on a time received for a corresponding message.

7. The method of claim 1, wherein the method is performed over a plurality of periods of time.

8. The method of claim 1, wherein the period of time extends from a user-defined previous point in time and extends until a current time.

9. A computer program product, comprising:
   a non-transitory processor readable medium having processor executable code embodied therein for displaying a live stream of events using a dynamically-constructed three-dimensional data tree, the processor readable medium having:
   processor executable program code to receive a plurality of messages into a message queue over a period of time;
   processor executable program code to construct a root limb object of the dynamically-constructed three-dimensional data tree, wherein the root limb object is aligned with a z-axis at the center of the dynamically-constructed three-dimensional data tree;
   processor executable program code to determine a key for each of the plurality of messages, wherein each key is determined, at least in part, as a function of a message length for a corresponding one of the plurality of messages;

processor executable program code to construct a plurality of limb objects branching out from the root limb object and from the z-axis of the dynamically-constructed three-dimensional data tree based, at least in part, on the determined keys;

processor executable program code to construct a plurality of blip objects at different locations along a corresponding one of the plurality of limb objects for each of the plurality of limb objects, wherein each of the plurality of blip objects correspond to one of the plurality of messages, and wherein the lip objects each have a position within the dynamically-constructed three-dimensional data tree corresponding to a particular time at which such message was received into the message queue such that blip objects are arranged along lengths of corresponding ones of the plurality of limb objects and down to the root limb object, whereby blip objects on outermost portions of the limb objects correspond to those most recently received of the plurality of messages and blip objects arranged toward the root limb object corresponding to less recently received of the plurality of objects; and processor executable program code to display, on a graphical user interface, the dynamically-constructed three-dimensional data tree, including displaying the root limb object, the plurality of limb objects, and the plurality of blip objects, wherein the dynamically-constructed three-dimensional data tree represents a visualization of the plurality of messages for the period of time, wherein the dynamically-constructed three-dimensional data tree comprises a tubular structure, aligned with the z-axis, that is generated by the constructing of the plurality of limb objects such that the blip objects form a surface of the tube structure extending from said outermost portions of the limb objects inwardly down to the root limb object.

10. The computer program product of claim 9, wherein each of the plurality of messages is an array of string values.

11. The computer program product of claim 9, wherein the plurality of limb objects are arranged into a plurality of levels, wherein each of the plurality of levels corresponds to a portion of the period of time.

12. The computer program product of claim 11, wherein, for each of the plurality of levels, a map is generated for a set of limb objects, from the plurality of limb objects, which were assigned to such level.

13. The computer program product of claim 11, wherein said portion of the period of time is a user-definable value.

14. The computer program product of claim 11, wherein each of the plurality of blip objects is placed on one of the plurality of limb objects to which it corresponds and in one of the plurality of levels based on a time received for a corresponding message.

15. The computer program product of claim 9, wherein the processor readable medium further comprises processor executable instructions for displaying the live stream of events using a dynamically-constructed three-dimensional data tree over a plurality of periods of time.

16. The computer program product of claim 9, wherein the period of time extends from a user-defined previous point in time and extends until a current time.

* * * * *